United States Patent
Moore et al.

(10) Patent No.: US 11,590,448 B2
(45) Date of Patent: Feb. 28, 2023

(54) SYSTEM AND METHOD FOR INTEGRATED ABSORBER INTERCOOLING VIA RICH SOLVENT STREAM USING 3D-PRINTED ACTIVE PACKINGS

(71) Applicant: Lawrence Livermore National Security, LLC, Livermore, CA (US)

(72) Inventors: Thomas Charles Reading Moore, Livermore, CA (US); Joshuah K. Stolaroff, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 218 days.

(21) Appl. No.: 17/064,174

(22) Filed: Oct. 6, 2020

(65) Prior Publication Data
US 2022/0105461 A1 Apr. 7, 2022

(51) Int. Cl.
*B01D 53/18* (2006.01)
*B01J 19/30* (2006.01)
*B01D 53/14* (2006.01)

(52) U.S. Cl.
CPC ......... *B01D 53/18* (2013.01); *B01D 53/1462* (2013.01); *B01J 19/30* (2013.01); *B01D 2257/504* (2013.01)

(58) Field of Classification Search
CPC ................ B01D 53/1475; B01D 53/02; B01D 53/1418; B01D 53/1425; B01D 53/1462; B01D 53/18; B01D 53/228; B01D 53/62
See application file for complete search history.

(56) References Cited

U.S. PATENT DOCUMENTS

2014/0335002 A1* 11/2014 Northrop ........... B01D 53/1406
 166/305.1
2018/0104642 A1* 4/2018 Mabrouk ........... B01D 53/1475

FOREIGN PATENT DOCUMENTS

WO WO-2004/073838 A1 9/2004

OTHER PUBLICATIONS

Miramontes, Eduardo, Ella A. Jiang, et al. "Process Intensification of $CO_2$ Absorption Using a 3D Printed Intensified Packing Device." AIChE Journal, vol. 66, No. 8, 2020. Crossref, doi:10.1002/aic.16285.

(Continued)

*Primary Examiner* — Sharon Pregler
(74) *Attorney, Agent, or Firm* — Harness, Dickey & Pierce, P.L.C.

(57) ABSTRACT

The present disclosure relates to an absorber column apparatus for removing a selected component of a gas. The apparatus may have a first zone, a second zone and a third zone, wherein the first and third zones form a first domain through which a first fluid laden with a select gaseous component to be removed therefrom flows along concurrently with a second fluid. The second fluid at least substantially removes the select gaseous component from the first fluid to create a third fluid. The first fluid leaves the absorber column as a fourth fluid with the select gaseous component at least substantially removed therefrom. The second zone forms an active packing zone including a structure which forms an independent second domain in thermal communication with the first domain. The second receives a quantity of the third fluid and channels it through the second zone to help cool at least one of the first and second fluids.

20 Claims, 5 Drawing Sheets

(56) References Cited

OTHER PUBLICATIONS

Chandrasekaran, Gokul. "3D Printed Heat Exchangers An Experimental Study." Mechanical Engineering (2018).

Femmer, Tim, et al. "Estimation of the Structure Dependent Performance of 3-D Rapid Prototyped Membranes." *Chemical Engineering Journal*, vol. 273, 2015, pp. 438-445. Crossref, doi:10.1016/j.cej.2015.03.029.

Lin, Yu-Jeng, and Gary T. Rochelle. "Approaching a Reversible Stripping Process for $CO_2$ Capture." *Chemical Engineering Journal*, vol. 283, 2016, pp. 1033-1043. Crossref, doi:10.1016/j.cej.2015.08.086.

Le Moullec, Yann, et al. "Process Modifications for Solvent-Based Post-Combustion $CO_2$ Capture." *International Journal of Greenhouse Gas Control*, vol. 31, 2014, pp. 96-112. Crossref, doi:10.1016/j.ijggc.2014.09.024.

Miramontes, Eduardo, et al. "Additively Manufactured Packed Bed Device for Process Intensification of $CO_2$ Absorption and Other Chemical Processes." *Chemical Engineering Journal*, vol. 388, 2020, p. 124092. Crossref, doi:10.1016/j.cej.2020.124092.

Oexmann, Jochen, and Alfons Kather. "Minimising the Regeneration Heat Duty of Post-Combustion $CO_2$ Capture by Wet Chemical Absorption: The Misguided Focus on Low Heat of Absorption Solvents." *International Journal of Greenhouse Gas Control*, vol. 4, No. 1, 2010, pp. 36-43. Crossref, doi:10.1016/j.ijggc.2009.09.010.

Saimpert, Matthias, et al. "A New Rate Based Absorber and Desorber Modelling Tool." *Chemical Engineering Science*, vol. 96, 2013, pp. 10-25. Crossref, doi:10.1016/j.ces.2013.03.013.

Wang, M., et al. "Post-Combustion $CO_2$ Capture with Chemical Absorption: A State-of-the-Art Review." *Chemical Engineering Research and Design*, vol. 89, No. 9, 2011, pp. 1609-1624. Crossref, doi: 10.1016/j.cherd.2010.11.005.

\* cited by examiner

SYSTEM AND METHOD FOR INTEGRATED ABSORBER INTERCOOLING VIA RICH SOLVENT STREAM USING 3D-PRINTED ACTIVE PACKINGS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for capturing $CO_2$ from a gas stream, and more particularly to systems and methods suitable for use in applications involving the large scale capture of $CO_2$ using a gas/liquid exchange column which contains additively manufactured structures to integrate heat exchange into the gas/liquid exchange column to control the temperature of the $CO_2$ absorption reaction. The systems and methods disclosed herein are especially well suited for use in power plants or industrial sources.

BACKGROUND

The statements in this section merely provide background information related to the present disclosure and may not constitute prior art.

Most commercial and proposed $CO_2$ capture systems use chemical solvents in a gas-liquid exchange column to separate $CO_2$ from a mixed gas stream. One challenge with these systems is that the absorption of $CO_2$ into the solvent is strongly exothermic, which increases the temperature of the solvent as it passes through the column. The capacity of the solvent to absorb $CO_2$, in turn, decreases at higher temperatures, which reduces the efficiency of the system.

One solution to this challenge is intercooling, a widely used technology (see, e.g., Wang et al., "*Post-combustion $CO_2$ capture with chemical absorption: a state-of-the-art review*," Chemical engineering research and design 89.9 (2011): 1609-162 2011). In traditional 'in-and-out' intercooling, the solvent is withdrawn part way up the column, cooled using an external unit, and then reinjected back into the absorption column. Intercooling reduces the magnitude of the temperature bulge, increasing the thermodynamic driving force for gas absorption and reducing the column height required for a given degree of separation. Various patents for intercooling technologies were described by Le Moullec et al., "*Process modifications for solvent-based post-combustion $CO_2$ capture*" International Journal of Greenhouse Gas Control 31 (2014): 96-112. (2014). While the cooling load for intercooling is usually supplied externally, at least one approach has proposed supplying this cooling load in a traditional in-out intercooler by heating the cool rich stream (see, e.g., Geleff et al., "*Method for recovery of carbon dioxide from a gaseous source*," Union Engineering," WO2004/073838 (2004)).

Triply Periodic Minimal Surface (TPMS) geometries produced via additive manufacturing techniques have been investigated in membrane reactor systems (see, e.g., Femmer et al., "*Estimation of the structure dependent performance of 3-D rapid prototyped membranes*," Chemical Engineering Journal 273 (2015): 438-4452015) and heat exchanger designs (see, e.g., Chandrasekaran, "3*D Printed Heat Exchangers An Experimental Study*," Mechanical Engineering (2018). The assignee of the present disclosure previously submitted a patent for TPMS heat exchangers, which is the subject of US 2020/0215480, published Jul. 9, 2020, the entire contents of which are hereby incorporated by reference into the present disclosure. The intensified heat exchange and geometric nature (two separate but intertwined volume domains) of TPMS structures allows a new kind of intercooling: in-line intercooling. With in-line intercooling, the flows through the gas-liquid exchange column remain continuous, but a secondary cooling fluid is flowed through an internal, separate set of channels in a portion of the column. TPMS geometries are not strictly required for in-line intercooling, but are advantageous compared to other known designs, such as the heat exchange packing designed by Miramontes et al., "*Additively Manufactured Packed Bed Device For Process Intensification Of $CO_2$ Absorption And Other Chemical Processes*," Chemical Engineering Journal 388 (2020) 124092.

SUMMARY

This section provides a general summary of the disclosure, and is not a comprehensive disclosure of its full scope or all of its features.

In one aspect the present disclosure relates to an absorber column apparatus for removing a selected component of a gas. The apparatus may comprise a first zone, a second zone and a third zone. The first and third zones form a first domain through which a first fluid laden with a select gaseous component to be removed therefrom flows concurrently with a second fluid, and wherein the second fluid operates to at least substantially remove the select gaseous component from the first fluid to create a third fluid. The first fluid leaves the absorber column as a fourth fluid having had the select gaseous component at least substantially removed therefrom. The second zone forms an active packing zone including a structure which forms an independent second domain in thermal communication with the first domain. The second zone operates to receive a quantity of the third fluid and to channel the quantity of the third fluid through the second zone to help cool at least one of the first fluid and the second fluid.

In another aspect the present disclosure relates to an absorber column apparatus for removing a selected component of a gas. The apparatus comprises a first zone, a second zone and a third zone. The first and third zones form a first domain through which a first fluid laden with a select gaseous component to be removed therefrom flows along concurrently with a second fluid. The second fluid operates to at least substantially remove the select gaseous component from the first fluid to create a third fluid. The first fluid leaves the absorber column as a fourth fluid having had the select gaseous component at least substantially removed therefrom. The second zone is arranged between the first and third zones and linearly in line with the first and third zones. The second zone forms an active packing zone including a structure which forms an independent second domain in thermal communication with the first domain. The second zone operates to receive a quantity of the third fluid at a first longitudinal end and to channel the quantity of the third fluid through the second zone to a second longitudinal end. This helps to cool both the first fluid and the second fluid.

In still another aspect the present disclosure relates to a method for removing a selected component of a gas using an absorber column. The method may comprise flowing a first fluid laden with a select gaseous component through first, second and third zones of the absorber column, in a first domain of the first, second and third zones. The method may further include flowing a second fluid through the first domain of the first, second and third zones concurrently with the first fluid. The method may further include using the second fluid to at least substantially remove the select gaseous component from the first fluid to thus create a third fluid, and wherein the first fluid leaves the absorber column as a fourth fluid having had the select gaseous component at least substantially removed therefrom. The method may further include causing at least a portion of the third fluid to be channeled into the second zone, wherein the second zone is comprised of a structure and material which forms an independent second domain in thermal contact with the first domain, by which heat from at least one of the first fluid and the second fluid is transferred to the third fluid to create a fourth fluid. The method may then include channeling the third fluid out of the second zone.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to a new design for a gas/liquid exchange column, which is especially effective and useful for large scale capture of $CO_2$ from power plants or industrial sources. The present disclosure provides a system which uses additively manufactured ("AM") structures to integrate heat exchange into a gas/liquid exchange column to control the temperature of $CO_2$ absorption reaction. By applying the heat exchange strategy described herein, the energy efficiency of the process is improved and the height of the column is reduced with less capital equipment required, as compared to current technology. Modelling results suggest that, in an otherwise conventional $CO_2$ capture system, the embodiments described herein are capable of reducing the column height by at least about 10-20%, while simultaneously recovering waste heat from the exothermic reactions occurring within the absorption column.

One important aspect of the present disclosure is in combining existing concepts for absorber intercooling and packing geometry into a novel configuration that yields the benefits of intercooling at reduced capital cost and equipment size. The embodiments disclosed herein work synergistically with, and especially effectively with, Triply Periodic Minimal Surface (TPMS) geometries.

Figure 1:
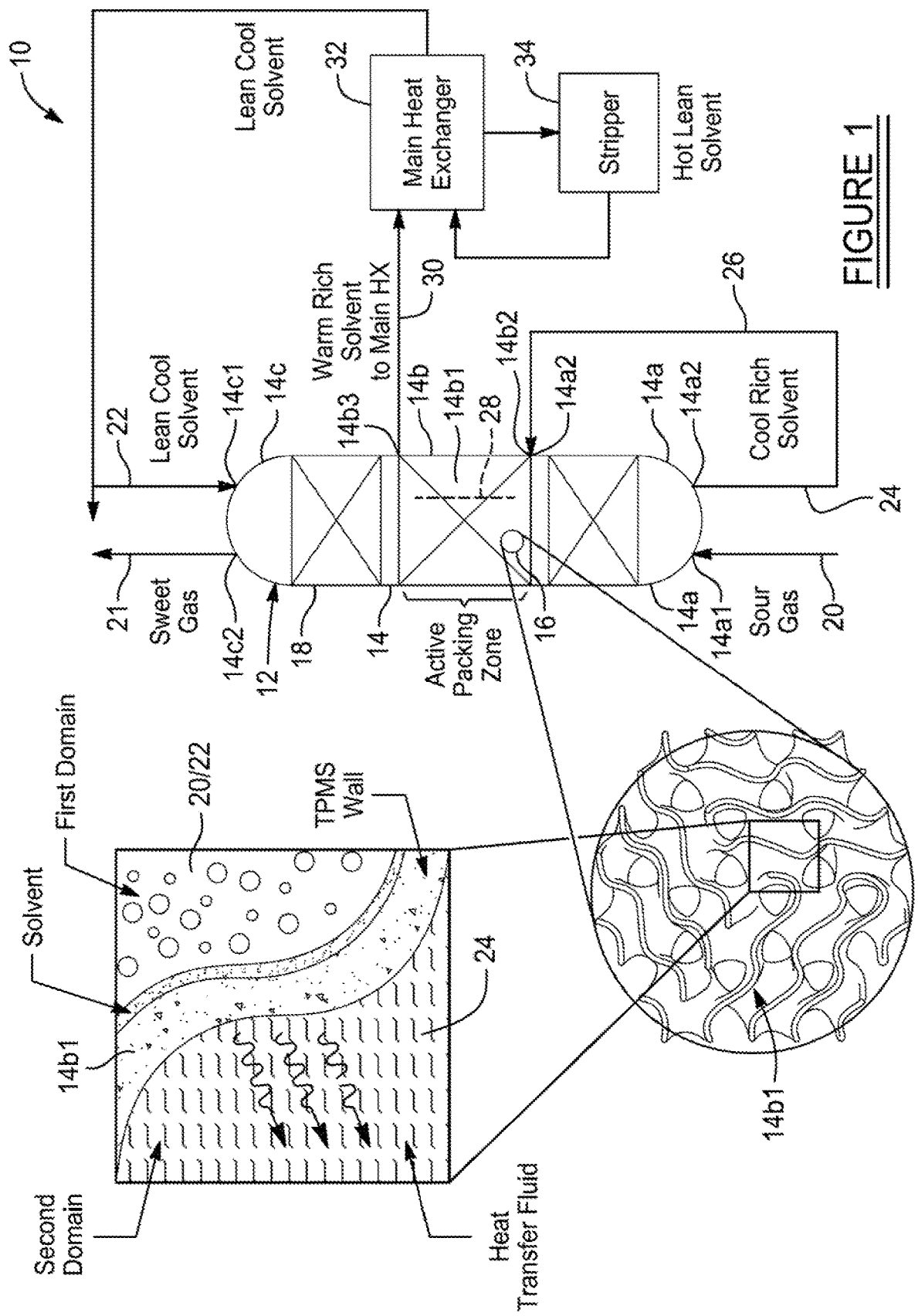
FIG. 1 is a high level side view of one embodiment of the present disclosure which incorporates an active packing zone made up of 3D printed active packings, and in which a rich solvent flows through a cooling fluid domain of the 3D printed active packings, absorbing heat from the solvent and gas phases, which flow in a separate domain.

One embodiment of a system 10 in accordance with the present disclosure is shown in FIG. 1. The system 10 in this embodiment utilizes 3D printed packings with two intertwined spatial domains as advanced, heat-exchange packings to help form an absorption column. A cooling fluid flows through a first domain of the absorption column and the solvent and gas phases flow through a second, separate domain. This configuration enables in situ absorber intercooling without the need for separate external cooling units. The structure of the heat exchange packings allows for very large heat exchange area between the two domains, typically on the order of 250 $m^2/m^3$. This in turn allows the system 10 to achieve highly efficient heat removal.

Referring further to FIG. 1, the system includes an absorber column 12 having a tubular housing 14 that defines three distinct, contiguous zones 14a, 14b and 14c. In this embodiment the second zone 14b forms which may be termed an "active packing" heat exchange zone which is made of an additively manufactured ("AM") structure 14b1, shown in one example in highly enlarged fashion in FIG. 1 as a triply periodic minimal surface ("TPMS") structure. While an AM produced TPMS structure has been found to be especially effective in enhancing heat removal from the cooling solvent flowing through the absorber column 12, other types of heat exchange packing structures, and particularly other types of additively manufactured packing structures, may be incorporated. Suitable AM manufactured TPMS heat exchange packing structures are taught in U.S. Patent Pub. No. 2020/0215480, the entire disclosure of which is hereby incorporated by reference into the present disclosure.

With the embodiment of the system 10 shown in FIG. 1, $CO_2$ laden gas 20 (i.e., "sour gas", which may be viewed as a "first fluid") flows into an input 14a1 at the bottom of the first zone 1, and begins to flow up through the first zone 14a, the second zone 14b and the through the third zone 14c within the absorber column 12. Simultaneously, a lean solvent 22 (i.e., a "second fluid") flows into the absorber column 12 and into the first domain through port 14c1 at an upper end of the first zone 14. The lean solvent 22 flows down through the second (i.e., active packing) zone 14b, through the first zone 14a, and exits the absorber column 12 at a port 14a2 at a lower end of the first zone 14a after having absorbed $CO_2$ from the $CO_2$ laden gas 20 which is also flowing in the first domain, but in the opposite direction through the first domain. At this point the lean solvent 22 has become a cool "rich" solvent 24 laden with $CO_2$ (i.e., a "third fluid"). Conversely, the sour gas 20 becomes a "sweet" gas 21 which is substantially or completely free of $CO_2$, as it exits from port 14c2 (i.e., as a "fourth fluid") in the upper end of the first zone 14a.

The $CO_2$ laden cool rich solvent 24 flows out through the port 14a2, into a conduit 26, and is channeled to an input port 14b2 at a lower end of the active packing zone 14b. The cool rich solvent 24 then flows into the second (i.e., fluid) domain, formed by the active packing zone 14b, to help cool the lean solvent 22 flowing in the first domain. In this regard it will be appreciated that the active packing structure 14b1 that forms the active packing zone 14b creates both the first and second domains in the active packing zone, which are separate flow domains, but which still enable a thermal transfer of heat from the $CO_2$ laden gas and the lean solvent 22 to the cool rich solvent 24. By first and second "domains" it will be understand that these terms mean separate flow channels or paths that are separated by the structure of the packing, but which still allow a thermal transfer of heat from the first domain to the fluid flowing in the second domain, as in the hot and cold sides of a heat exchanger.

As the cool rich solvent 24 flows through the second domain formed by the active packing zone 14b it absorbs heat from the $CO_2$ laden gas and the lean solvent 22 and becomes a warm, rich solvent 28. The warm rich solvent 28 exits a port 14b3 at an upper end of the active packing zone 14b and is channeled via a conduit 30 to a main heat exchange unit 32.

While the use of heat exchange packings opens up a wide range of heat integration strategies, one particularly important aspect of the absorber column design presented herein is that the absorber column 12 is able to make use of the cool rich solvent 24 stream exiting the absorber column by redirecting it back into the heat exchange domain (i.e., the active packing zone 14b).

The design of the system 10 provides a number of important features. For one, as with many intercooling strategies, reduction of the temperature bulge is expected to reduce the required absorber column 12 height by at least about 10-20% over what would be required for a conventional absorber column. Larger size reductions are possible, depending on the solvent and process configuration. Another important advantage is that by using the cool rich solvent 24 stream as the cooling fluid, the system 10 eliminates the cooling load required by traditional intercooling technologies. Still another important feature is that by using the cool rich solvent 24 stream as the cooling fluid, waste heat released by exothermic reactions within the absorber column 12 is recovered, thus reducing the reboiler heat duty and energy requirements of the overall process.

With further reference to FIG. 1, after the cool rich solvent 24 is preheated in the absorber column 12 (using heat which would otherwise be wasted) it is passed through the main heat exchanger 32 and then flows into a stripper 34. Because the mass flow rate of the warm rich solvent 28 stream (which contains $CO_2$) is larger than the mass flow rate of the lean solvent 22 stream (which does not contain $CO_2$), the main heat exchanger 32 is usually cold-side pinched, and so the main heat exchanger is unable to heat the rich stream up to stripper temperature. This extra sensible heat must be supplied in the stripper's reboiler and contributes 10-20% of the total reboiler heat duty (Oexmann et al. 2010). With the system 10, simulation results described below suggest that the waste heat recovered from the absorber column 12 and transferred to the cool rich solvent 24 may lead to a modest increase in the temperature of the cool, rich solvent 24 stream, reducing the sensible heat component of the reboiler heat duty.

While the length of the active packing zone 14b may vary significantly, in one embodiment it is preferably between about 1% to about 25% of the overall length of the absorber column 12, and in some embodiments it is preferably about 10% of the overall length of the absorber column 12. The specific implementation will dictate the precise length of the active packing zone 14b that is needed for optimal cooling, and may fall significantly above or below the above-mentioned range for some applications.

Another benefit of the absorber column 12 design is that the absorber column, with its "in-line" construction of the active packing zone 14b with the other zones 14a and 14c, enables a highly space efficient system to be constructed. This construction of the absorber column 12 minimizes the external conduits and ducting that would otherwise be needed with conventional absorber column designs.

Figure 2:
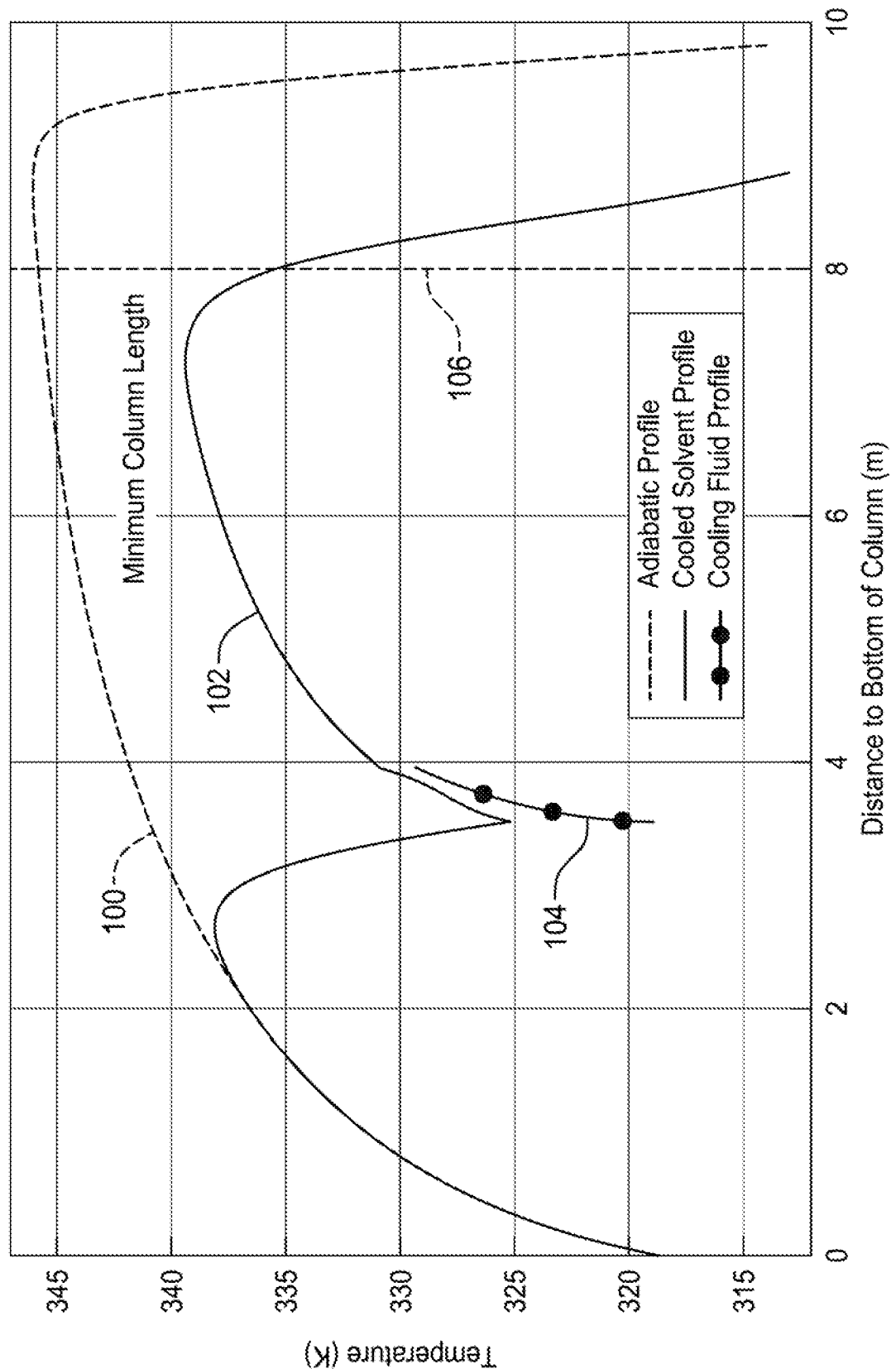
FIG. 2 is graph showing modelled temperature profiles for an adiabatic column (dashed line), an intercooled column (solid black line), and the cooling fluid (dotted line) which in this case is the cool rich solvent redirected from the bottom of the column and passed through a single section of active packing 10% of the total column length.

One Example: Application to Post-Combustion Carbon Capture from a Coal Power Plant To demonstrate the efficacy of this approach, the co-inventors created a simulation of an absorption column utilizing Monoethanol Amine (MEA) to capture $CO_2$ from a flue gas stream. The simulation is based on the rate-based model described by Saimpert et al., "*A new rate based absorber and desorber modelling tool*," Chemical engineering science 96 (2013):10-25 (2013). The solvent is 30 wt % MEA, and the flue gas stream is a 10% $CO_2$, 5% water, and 85% $N_2$. In FIG. 2, a graph 100 shows a temperature profile along the length of the absorption column is plotted for a traditional adiabatic column. Additional graphs 102 and 104 are plotted for a column intercooled using the strategy discussed above. Both the liquid solvent temperature profile 102 and the cooling fluid temperature profile 104 are plotted. In this plot, the minimum possible column height 106 is also shown; this was calculated by using an optimization algorithm to calculate the temperature profile within the column which minimized the column height.

For the simulation results shown in FIG. 2, the "cooling fluid" is in fact the cool, rich solvent 24 (see FIG. 1), and the active TPMS packings are only used for 10% of the total column height (i.e., in the region spanning 40% to 50% of the column height, or put differently, the region comprising about 10% of the overall height at around an approximate middle area of the column). The rest of the column uses traditional packings. FIG. 2 also shows the minimum possible column length to achieve 90% $CO_2$ capture at the given gas/liquid flowrates (conditions: 90% Capture from gas stream containing 10% $CO_2$ and 5% $H_2O$ using 30 wt % MEA with $\theta_{lean}$=0.25. The Inlet gas and liquid temperatures were 40° C. The gas Flow rate was 50 mol/m²s. The liquid flowrate was 207.6 mol/m²s=1.2 $L_{min}$.

FIG. 2 shows that with the absorber column design described above, after the cool rich solvent exits the bottom of the absorber, it is pumped to approximately 40% of the absorber height, at which point it is directed into the heat exchange domain in the TPMS packings. It then flows up the absorber column through this domain (i.e., second domain), absorbing waste heat from the solvent flowing through the absorber, as the waste heat passes through the walls of the TPMS packing, before exiting the column at about 50% of the column height.

Figure 3:
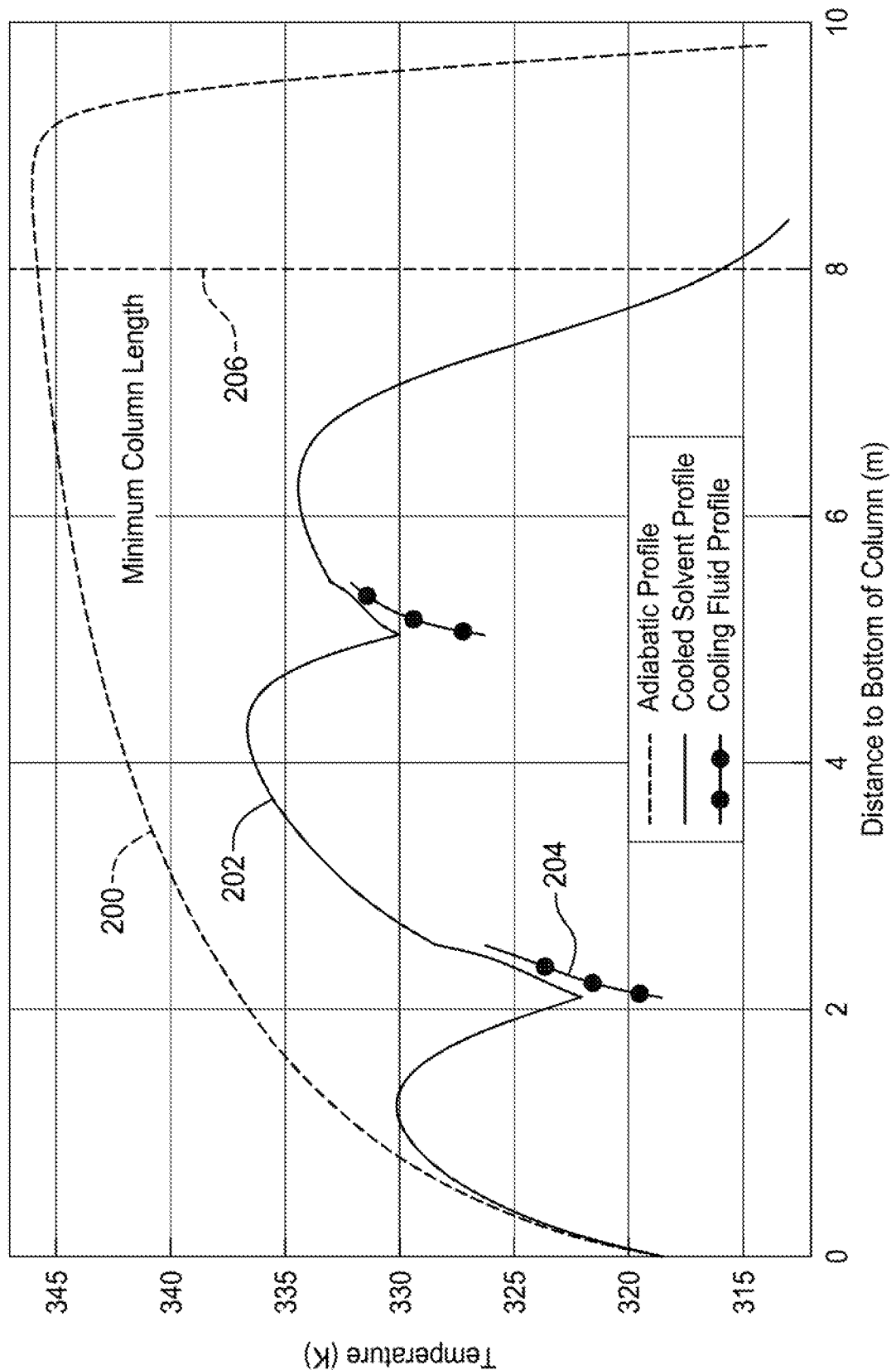
FIG. 3 is a showing modelled temperature profile curves for an alternative embodiment of the system of FIG. 1 which instead of just one active packing zone, incorporates two separate active packing zones, and wherein temperature profile curves are shown for an adiabatic column, an intercooled column, and the cooling fluid, which in this case is the cool rich solvent redirected from the bottom of the absorber column and passed through the two separate active packing zones or regions, and wherein each active packing region is about 5% of the total length of the absorber column.

FIG. 3 shows the modelled temperature profile curves for another embodiment of the system 10 in which two separate active packing regions, each being about 5% of the total column length, and being arranged on opposite sides of a midpoint of the absorber column, are used in forming the absorber column. In FIG. 3 the modelled temperature profile curves 200, 202 and 204 are shown for an adiabatic column (curve 202), an intercooled column (curve 202), and the cooling fluid (curve 204). The cooling fluid in this case is the cool rich solvent 24 which is redirected from the bottom of the absorber column 12 and passed through two separate regions (i.e., sections) of the active packing zone 14b, each being 5% of the total length of the absorber column. The minimum possible column length to achieve 90% $CO_2$ capture at the given gas/liquid flowrates is also shown by dashed line 206. The conditions included 90% Capture from gas stream containing 10% $CO_2$ and 5% $H_2O$ using 30 wt % MEA with $\theta_{lean}$=0.25. The Inlet gas and liquid temperatures were 40° C. The gas flow rate was 50 mol/m$^2$s, and the liquid flow rate was 207.6 mol/m$^2$s=1.2 $L_{min}$.

In these examples the cool rich solvent 24 is heated by about 10-15° K, relative to the adiabatic case, which means that the cool rich solvent has received on the order of 10-20% of the total sensible heat required to heat it from absorber temperature (about 313° K) to stripper temperature (383-423° K) (Lin et al 2016). As the main heat exchange is cool side pinched, there is scope for further increases in temperature in the warm, rich stream (warm rich stream 28 in FIG. 1), and an energy balance over the main heat exchanger suggests that a 10-15° K increase in the cool, rich stream temperature will lead to on the order of 1-2° K increase in the warm, rich stream. Comparison with the energy balance of Oexmann et al. (2010) provides an estimate for the reduction in reboiler heat duty of at least about 1-2%. Overall, the system 10 and its process of operation is expected to provide effective intercooling in the absorber column 12 without the cooling duty common to traditional intercooling processes, while simultaneously recovering waste energy from the absorber column, leading to desirable (e.g., at least 1-2%) reductions in reboiler heat duty.

Figure 4:
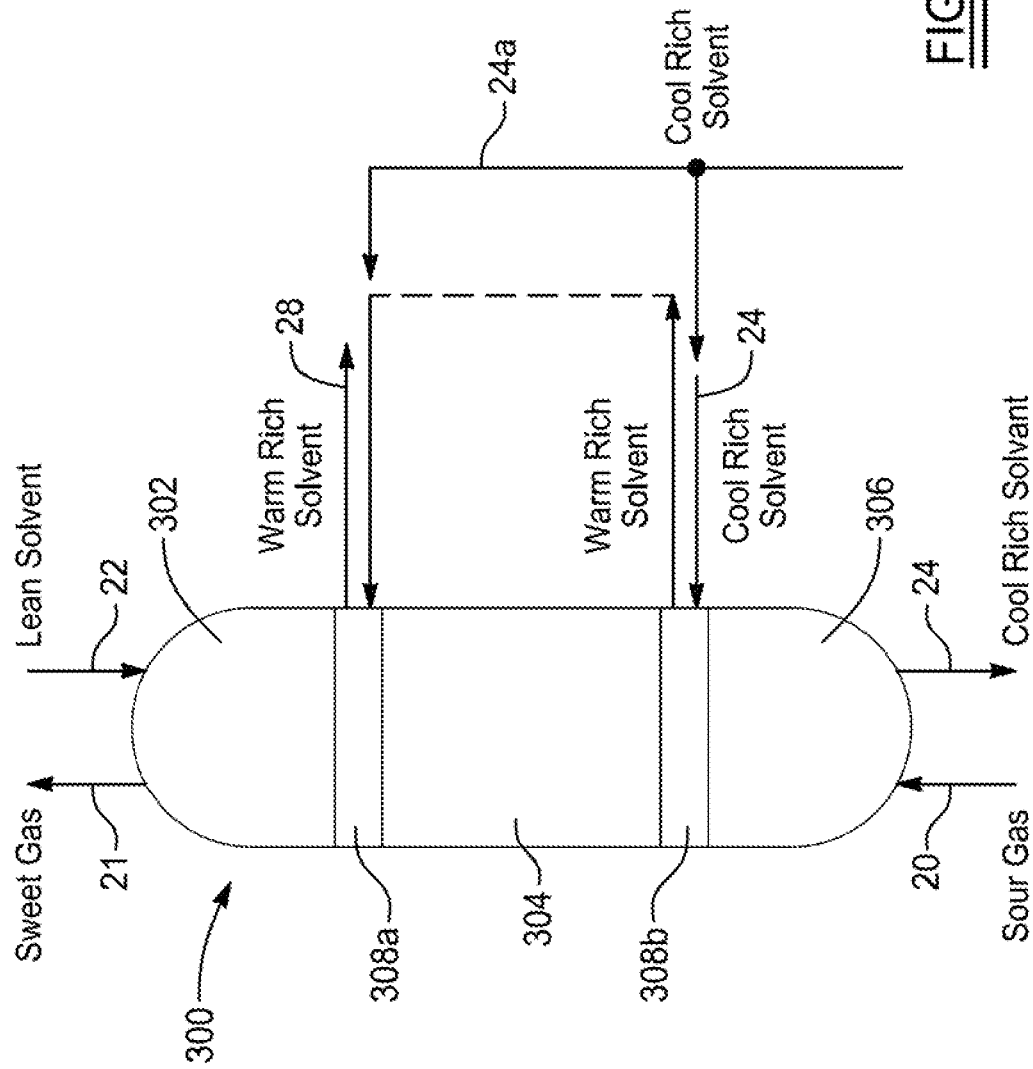
FIG. 4 shows a high level depiction of the alternative embodiment described above in the discussion of FIG. 3, in which two spaced apart active packing zones are used in the absorber column. The absorber column 300 of this alternative embodiment has a first zone 302, a second zone 304, a third zone 306, with two separate active packing zones 308a and 308b interspersed between zones 302/304 and 304/306.

FIG. 4 shows a high level depiction of an alternative embodiment 300 of an absorber column, as was described above in the discussion of FIG. 3. As described above, the absorber column 300 of this alternative embodiment has a first zone 302, a second zone 304, a third zone 306, with two separate active packing zones 308a and 308b interspersed between zones 302/304 and 304/306. In one embodiment each of these active packing zones 308a and 308b comprise about 5% of the overall length of the absorber column 300, although it will be appreciated that this could be varied to increase or decrease the overall length (i.e., greater or less than a total of 10% of the total length), as needed for a specific implementation. Also, even more than two active packing zones could be provided. The cool rich solvent 24 can be supplied in serial fashion first to the active packing zone 308b, and then routed out of that zone into the other active packing zone 308a. Alternatively, a parallel connection could be made to the inputs of the two active packing zones, as indicted by line 24a in FIG. 4, in which the cool rich solvent 24 is simultaneously supplied into both of the active packing zones 308a and 308b, and withdrawn simultaneously into a parallel coupled channel for redirection to the main heat exchanger 32. If more than two active packing zones are employed, potentially a combination of serial and parallel connections could also be employed to route fluids into the active packing zones 308a and 308b and to retrieve fluids from the active packing zones, using both serial and parallel flow schemes.

Figure 5:
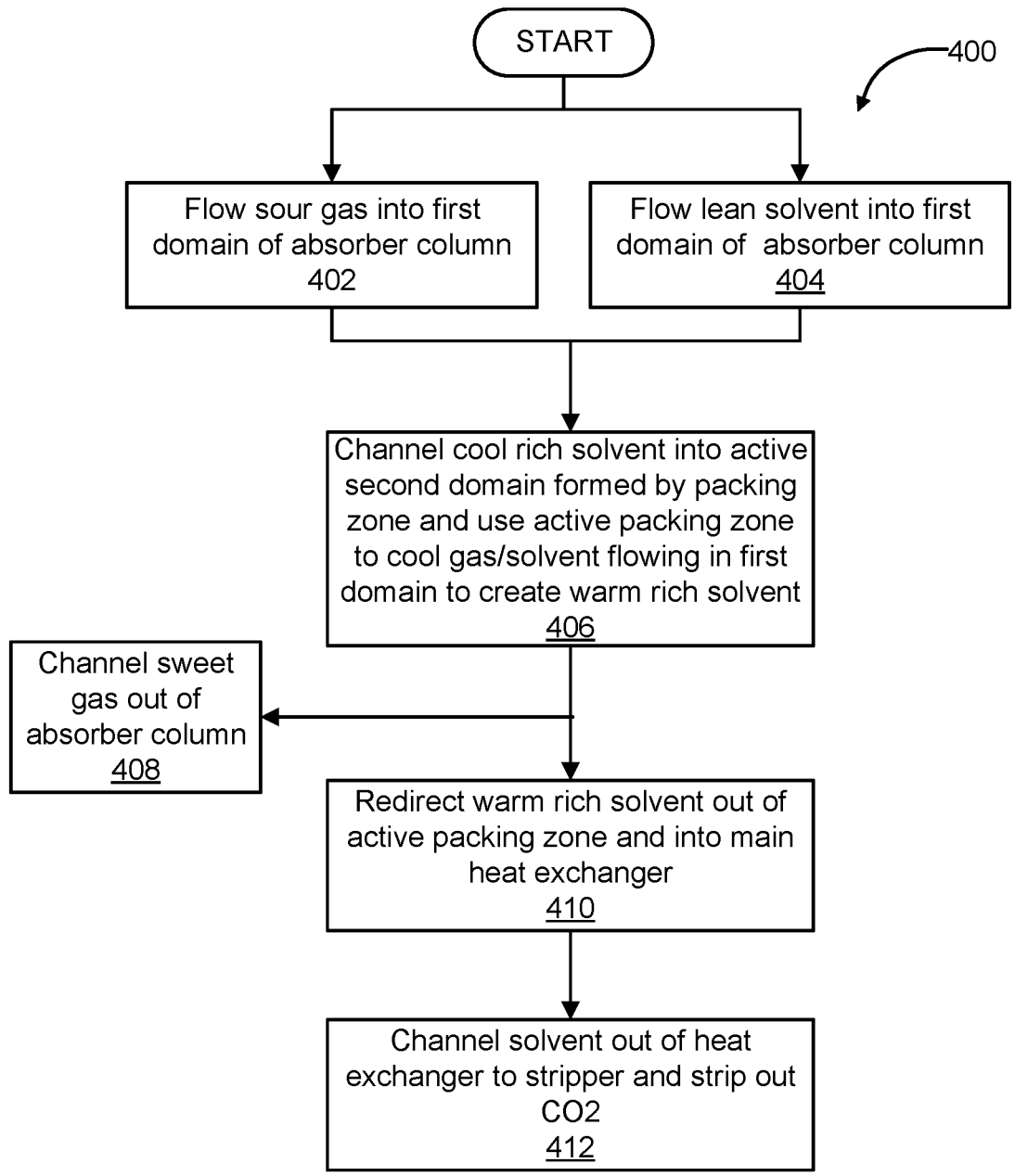
FIG. 5 is a high level flowchart of various operations that may be performed by the system of FIG. 1.

Referring to FIG. 5, a high level flowchart 400 is shown of major operations that may be performed by the system 10 during its operation. At operation 402 sour gas 20 (i.e., gas laden with $CO_2$) is injected into the input 14a1, while simultaneously a flow of lean solvent 22 is input into input port 14c1 at the opposing (i.e., upper) end of the absorber column 12. As the sour gas 20 and the lean solvent 22 flow through the absorber column 12 concurrently in opposite directions but in the same domain, the lean solvent absorbs the $CO_2$ and becomes the cool rich solvent 24. At operation 406 the cool rich solvent 24 is fed into the input 14b2 of the active packing zone 14b. As the cool rich solvent 24 flows through the active packing zone 14b it becomes the warm rich solvent 28. While this is occurring the sweet gas 21 is exiting the absorber column 12 at exit port 14c2, as indicated at operation 408. At operation 410 the warm rich solvent 28 is directed out of the active packing zone 14b at port 14b3 and through conduit 30 to the main heat exchanger 32, as indicated at operation 410. The solvent warm rich solvent 28 is then channeled out of the heat exchanger 32 to the stripper 34 where the $CO_2$ component is fully removed from the solvent, as indicated at operation 412. This produces a new quantity of the cool lean solvent 22, which may then be fed back to the absorber column 12 input 14c1.

The system 10 is expected to find particular utility in industrial processes, for example an industrial carbon capture process, to reduce absorber height, absorber intercooler cooling duty, and reboiler heat duty. A significant advantage of the system 10 is in forming a shorter absorber column to achieve a given amount of $CO_2$ removal from a given gas, without the need for a separate cooling fluid. Also, by flowing the cool rich solvent 28 through an active packing zone which forms a second domain in the absorber column, the cooling of the solvent can be achieved without significantly increasing the complexity of the absorber column.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An absorber column apparatus for removing a selected component of a gas, the apparatus comprising:
    a first zone, a second zone and a third zone;
    the first and third zones forming a first domain through which a first fluid laden with a select gaseous component to be removed therefrom flows concurrently with a second fluid, and wherein the second fluid operates to at least substantially remove the select gaseous component from the first fluid to create a third fluid, and wherein the first fluid leaves the apparatus as a fourth fluid having had the select gaseous component at least substantially removed therefrom; and
    the second zone forming an active packing zone including a structure which forms an independent second domain in thermal communication with the first domain, the second zone operating to receive a quantity of the third fluid and to channel the quantity of the third fluid through the second zone to help cool the at least one of the first fluid and the second fluid.

2. The apparatus of claim 1, wherein the first, second and third zones are contiguous.

3. The apparatus of claim 1, wherein the second zone is arranged between the first and third zones.

4. The apparatus of claim 1, wherein the first, second and third zones form a straight linear arrangement.

5. The apparatus of claim 1, wherein the second zone comprises an additively manufactured packing structure.

6. The apparatus of claim 5, wherein the additively manufactured packing structure comprises a triply periodic minimal surface (TPMS) structure which operates to transfer heat from the first domain to the second domain.

7. The apparatus of claim 1, wherein the second fluid comprises a solvent which is flowed in an opposite direction through the apparatus as the first fluid.

8. The apparatus of claim 1, wherein the third fluid is input to the second zone at a first longitudinal end of the second zone, and withdrawn out from the apparatus at a second longitudinal end of the second zone.

9. The apparatus of claim 1, further comprising a fourth zone forming an additional active packing zone for further assisting in cooling at least one of the first fluid and the second fluid.

10. The apparatus of claim 1, wherein the second zone comprises between 1%-25% of an overall length of the apparatus.

11. The apparatus of claim 1, wherein the second zone comprises approximately 10% of a total length of the apparatus.

12. An absorber column apparatus for removing a selected component of a gas, the apparatus comprising:
    a first zone, a second zone and a third zone;
    the first and third zones forming a first domain through which a first fluid laden with a select gaseous component to be removed therefrom flows along concurrently with a second fluid, and wherein the second fluid operates to at least substantially remove the select gaseous component from the first fluid to create a third fluid, and wherein the first fluid leaves the apparatus as a fourth fluid having had the select gaseous component at least substantially removed therefrom; and
    the second zone being arranged between the first and third zones and linearly in line with the first and third zones; and
    the second zone forming an active packing zone including a structure which forms an independent second domain in thermal communication with the first domain, the second zone operating to receive a quantity of the third fluid at a first longitudinal end, and to channel the quantity of the third fluid through the second zone to a second longitudinal end, to help cool both the first fluid and the second fluid.

13. The apparatus of claim 12, wherein the active packing structure comprises an additively manufactured structure.

14. The apparatus of claim 12, wherein the active packing structure comprise a triply periodic minimal surface (TPMS) structure.

15. The apparatus of claim 12, wherein the second zone comprises between 5%-25% of an overall length of the apparatus.

16. The apparatus of claim 12, wherein the second zone comprises approximately 10% of a total length of the apparatus.

17. The apparatus of claim 12, wherein the second fluid comprises a solvent.

18. A method for removing a selected component of a gas using an absorber column, the method comprising:
   flowing a first fluid laden with a select gaseous component through a first, second and third zones of the absorber column, in a first domain of the first, second and third zones;
   flowing a second fluid through the first domain of the first, second and third zones concurrently with the first fluid;
   using the second fluid to at least substantially remove the select gaseous component from the first fluid to thus create a third fluid, and wherein the first fluid leaves the absorber column as a fourth fluid having had the select gaseous component at least substantially removed therefrom; and
   causing at least a portion of the third fluid to be channeled into the second zone, wherein the second zone is comprised of a structure and material which forms an independent second domain in thermal contact with the first domain, by which heat from at least one of the first fluid and the second fluid is transferred to the third fluid to create a fourth fluid; and
   channeling the third fluid out of the second zone.

19. The method of claim 18, wherein flowing the first and second fluids through the first, second and third zones comprises flowing the first and second fluids through a second zone formed by an active packing material.

20. The method of claim 19, wherein flowing the first and second fluids through the active packing material comprises flowing the first and second fluids through an additively manufactured triply periodic minimal surface (TPMS) structure.

* * * * *